United States Patent
Tutikawa

(10) Patent No.: US 6,592,312 B1
(45) Date of Patent: Jul. 15, 2003

(54) BOLT EMPLOYING SHEARING STRESS FOR SELF-LOCKING

(75) Inventor: Yoshiji Tutikawa, 7-20, Hiranonishi 3-chome, Horano-ku, Osaka-shi, Osaka 547-0033 (JP)

(73) Assignee: Yoshiji Tutikawa, Osaka (JP)

( * ) Notice: Subject to any disclaimer, the term of this patent is extended or adjusted under 35 U.S.C. 154(b) by 0 days.

(21) Appl. No.: 09/486,381

(22) PCT Filed: Aug. 29, 1997

(86) PCT No.: PCT/JP97/03039

§ 371 (c)(1),
(2), (4) Date: May 22, 2000

(87) PCT Pub. No.: WO98/10198

PCT Pub. Date: Mar. 12, 1998

(30) Foreign Application Priority Data

Sep. 3, 1996 (JP) .............................................. 8-253707

(51) Int. Cl.[7] .............................................. F16B 39/28
(52) U.S. Cl. ...................................... 411/274; 411/936
(58) Field of Search ................................ 411/230, 274, 411/936

(56) References Cited

U.S. PATENT DOCUMENTS 1,387,085 A * 8/1921 Whippey
3,438,417 A * 4/1969 Albris

FOREIGN PATENT DOCUMENTS

JP  50-88754   7/1975
JP  2-6813     1/1990

* cited by examiner

*Primary Examiner*—Flemming Saether
(74) *Attorney, Agent, or Firm*—McDermott, Will & Emery

(57) ABSTRACT

A locking threaded bolt is provided whose head has an inclined seat surface. The angle of the incline of the head seat surface is such that when the bolt is tightened to a predetermined torque within a threaded hole, the entire seat surface is in contact with the upper surface of an article to be fastened, and a shearing stress is applied to the shank of the bolt in a transverse direction. This shearing stress causes reduced clearance between the threads of the bolt and the threads of the threaded hole, thereby firmly locking the bolt in the hole and preventing loosening of the bolt.

2 Claims, 4 Drawing Sheets

BOLT EMPLOYING SHEARING STRESS FOR SELF-LOCKING

TECHNICAL FIELD

The present invention relates to a bolt protected from loosening itself on one hand, and also to a method of protecting a bolt from loosening itself on the other hand.

BACKGROUND ART

Some proposals have been made to prevent a bolt set in place from being loosened unintentionally. In one of the well known proposals, a cutout is formed in the threaded shank of a bolt and along periphery thereof so as to secure in the cutout an appropriate spring or a resilient plastics piece.

However, such a proposal would raise manufacture cost due to the secondary machining of the threaded shank and a considerably intricate work to set the spring or resilient piece in place. Further, these spring and piece would undesirably cause an additional torque to be required even to initially fasten such a bolt into a female-threaded hole, thereby rendering uneasy the bolt fastening operations. In addition, deterioration of the spring or elastic piece would take place along the course of time, impairing their effect of locking the bolt.

Primary objects of the present invention, that was made in view of these problems in the prior proposals, are to provide a surely lockable bolt and a method of surely locking a bolt in place wherein the bolt's head is simply improved as to its seat surface without need of any additional member.

SUMMARY OF THE INVENTION

In order to achieve the objects, here is employed the following technical means. Namely, a self-lockable bolt 'A' provided herein does comprises a threaded shank 1 continuing to an enlarged head 2 that has a seat surface 3 gently inclined sideways in one direction. The angle α of the inclined seat surface 3 is selected herein within such a range that an upper side of an article 'C' to be tightened with the bolt 'A' will be pressed in a normal direction with its head 2 and simultaneously a stress is imparted to the bolt in such a transverse direction as tending to shear the bolt's shank, when a predetermined torque is applied to the bolt so as to fasten same into a female-threaded hole 'B'.

The method proposed herein for preventing a bolt from loosening itself does characteristically comprise the steps of preparing a self-lockable bolt 'A' having a threaded shank 1 continuing to an enlarged head 2 that has a seat surface 3 gently inclined sideways in one direction and at an angle α, and then fastening the bolt with a predetermined maximum torque into a female-threaded hole 'B' to such an extent that due to the angle α an upper side of an article 'C' to be tightened with the bolt 'A' will be pressed in a normal direction with the head 2 and simultaneously a stress will be imparted to the bolt in such a transverse direction as tending to shear the shank 1.

MODE OF CARRYING OUT INVENTION

Figure 1:
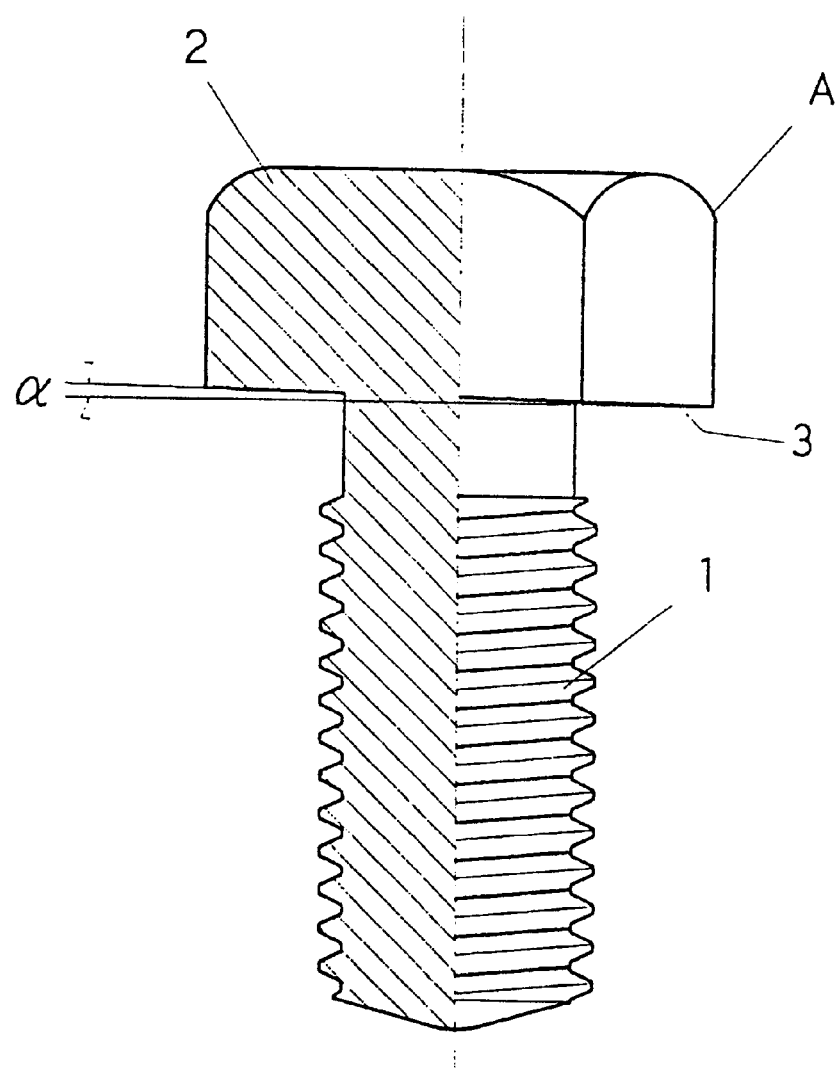
FIG. 1 is a front elevation of a self-lockable bolt provided in an embodiment of the present invention and partly shown in cross section.
Figure 2:
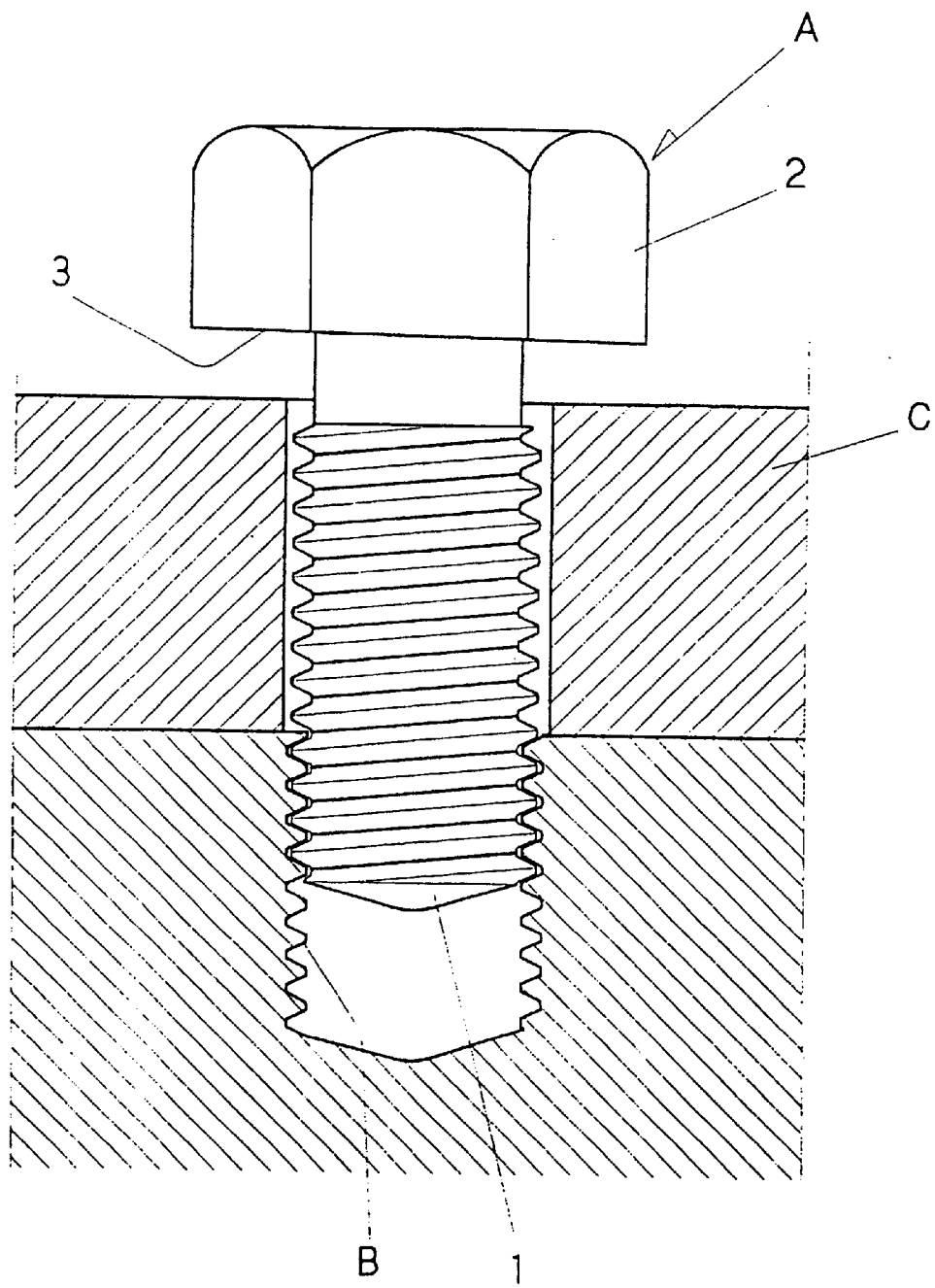
FIG. 2 is a cross section of the bolt that is being fastened.

Some preferable embodiments of the present invention will now be described referring to the drawings. In the drawings, the reference symbol 'A' denotes a metal bolt having a threaded shank 1 whose upper end is formed integral with a larger-diameter head 2. A bottom surface, i.e., seat face or surface 3 is slanted gently towards one lateral side in the drawings. An angle at which the seat surface 3 is inclined is selected within a range such that an article 'C' to be tightened with the bolt 'A' will be pressed in a normal direction with its head 2 and simultaneously a stress is imparted to the bolt in such a transverse direction as tending to shear the bolt's shank, when applying a predetermined maximum torque to fasten same into a female-threaded hole 'B'.

The angle α of the inclined seat surface may generally be from about 1.0 degree to about 3.0 degrees, though variable depending on the size of said bolt. The predetermined maximum torque referred to above may be that which corresponds to a standard fastening torque for the usual metal headed-bolt of the corresponding size, or which may be greater than said standard torque by about 10% thereof. For examples, the predetermined torque may be 50–60 Kgf·cm for hexagonally-headed metal bolts 'M6', and 400–500 Kgf-cm for similar bolts 'M12'.

Figure 3:
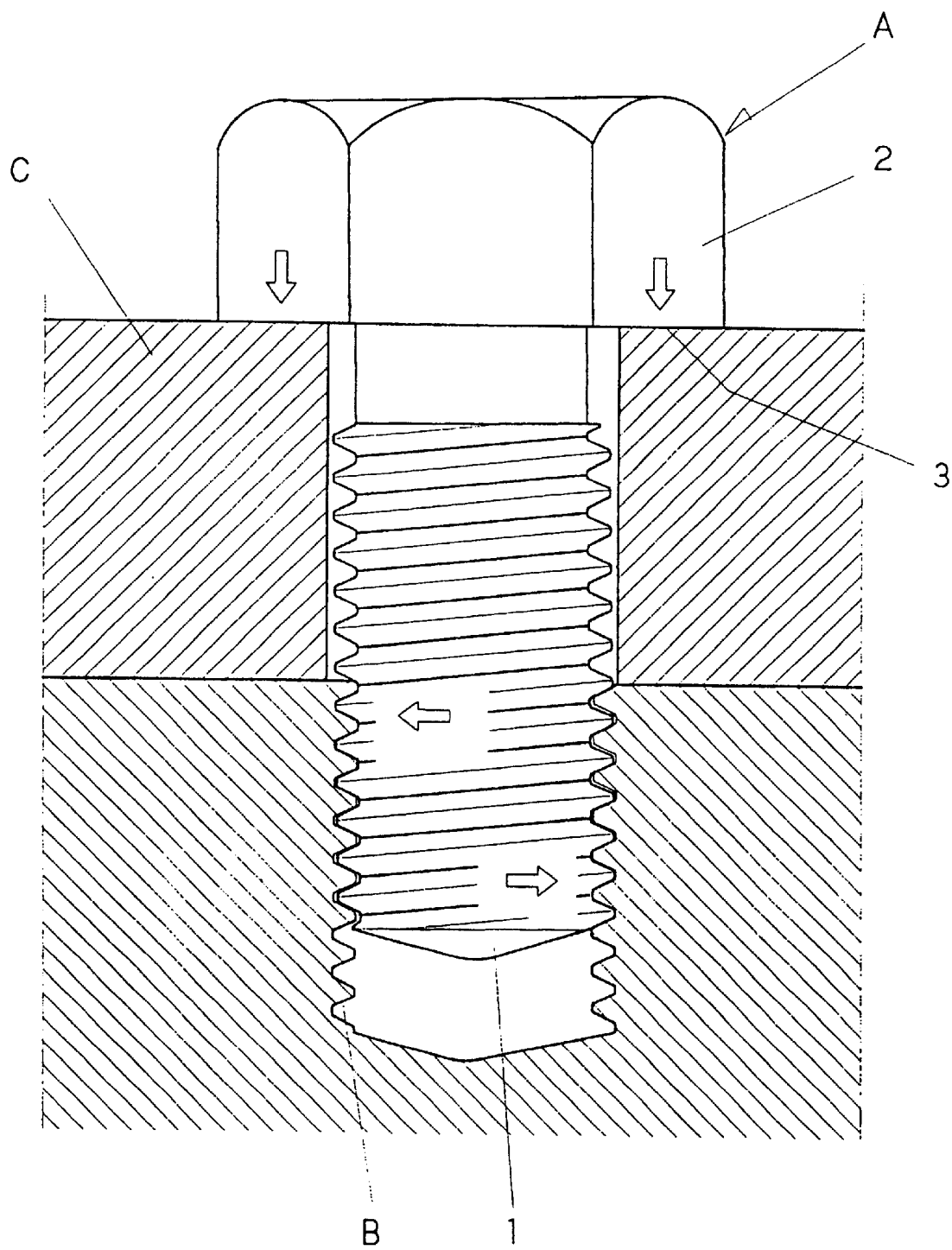
FIG. 3 is an enlarged cross section of the bolt that has been fastened.
Figure 4:
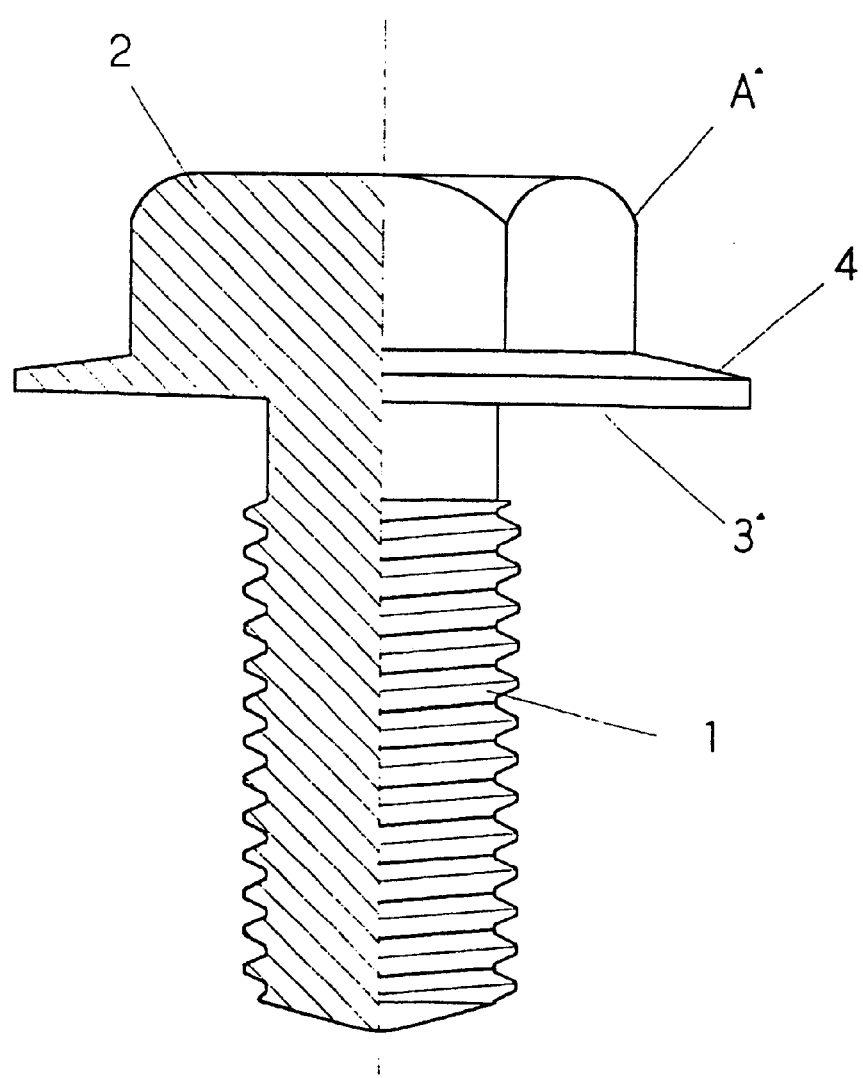
FIG. 4 is a cross section of a self-lockable bolt provided in another embodiment of the present invention.

In use of the described bolt 'A', it will be fitted in a threaded hole 'B' and be then twisted initially to such an extent that the slanted seat surface 3 abuts against an upper side of an article 'C' that is to be fastened. Subsequently, the bolt 'A' will be further tightened with the predetermined maximum torque as discussed above. As a result the bolt's head 2 will be forced into a slightly oblique position so that its slanted seat 3 is finally and entirely set in a surface contact with the article's upper side as shown in FIG. 3. In this state, an upper region and a lower region of the threaded shank are pressed on different inner peripheral zones of the female-threaded hole 'B', in opposite transverse directions as shown at the arrows in FIG. 3. This means that a shearing-stress remains applied to the shank in such a direction as tending to shear it transversely, thanks to the forced entire surface contact of the slanted seat 3 with the upper side of said article 'C'. Such an internal stress and strain will reduce clearance between threads of said bolt 'A' and hole 'B', thus firmly locking the former not to tend to unintentionally loosen within the latter.

The present inventor has prepared samples of 'M12' metal bolt having a shank 55 mm long and having a seat surface inclined at an angle of 2.3 degrees. A public laboratory has conducted a vibration test on the four samples and found that they withstood 5 minutes or longer period of vibration, in contrast with four standard or normal bolts having loosened within 40 seconds.

Structural details of the embodiment discussed above does never delimit the scope of the present invention. For example, the smooth inclined seat surface 3 may be replaced with a series of consecutive steps or with a continuous series of corrugations. Alternatively, a bolt A' may have an integral flange 4 disposed below its head, with this flange having a lower surface 3' inclined in the same fashion as described herein above. Any other modifications may be possible provided that the features of the present invention is ensured to achieve the objects mentioned above and the following advantages are afforded.

In summary the bolt provided herein has a head that is simply improved to have a seat surface slightly slanted in one direction so that any conventional bolt former can be used to make such a seat surface at the same time as forming a body of that bolt. Therefore, the bolt of the present invention can now be manufactured at a scarcely raised cost. The internal stress and strain produced by fastening the bolt will give rise to a shank shearing force on one hand as well as a normal pressure onto an article being secured to another article. Consequently, clearance between threads of the bolt and the article is reduced to effectively protect the bolt from loosening itself. The easy initial putting of the bolt into the threaded hole will ensure smooth construction or the like works, as in the case of ordinary bolts.

What is claimed is:

1. A locking bolt comprising:
    a threaded shank, threadingly engageable with a female-threaded hole, the shank having a longitudinal axis and a transverse axis orthogonal to the longitudinal axis; and
    a head continuous with the shank and having a seat surface engageable with an upper surface of an article to be fastened;
    wherein the head seat surface is inclined at an angle of essentially 2.3 degrees from the transverse axis of the shank, such that when the shank is threadingly engaged with the female-threaded hole and a predetermined torque is applied to the bolt, the head seat surface is flush with the upper surface of the article and a shearing stress is simultaneously applied to the shank substantially along the transverse axis.

2. A method of locking a bolt in position, the method comprising:
    providing a bolt comprising a threaded shank having a longitudinal axis and a transverse axis orthogonal to the longitudinal axis, and a head continuous with the shank having a seat surface inclined at an angle of essentially 2.3 degrees from the transverse axis of the shank;
    threadingly engaging the shank with a female-threaded hole; and
    applying a predetermined torque to the bolt such that the head seat surface is flush with an upper surface of an article to be fastened and a shearing stress is simultaneously applied to the shank substantially along the transverse axis.

* * * * *